United States Patent Office 3,102,269
Patented Aug. 27, 1963

3,102,269
PROCESS FOR THE MANUFACTURE OF
HYDROCYANIC ACID
John Benjamin Warren, Widnes, England, assignor to
Imperial Chemical Industries Limited, London, England, a corporation of Great Britain
No Drawing. Filed July 17, 1961, Ser. No. 124,332
7 Claims. (Cl. 23—151)

This invention relates to a process for the manufacture of hydrocyanic acid. More particularly it relates to a process for the manufacture of hydrocyanic acid by reaction in the vapour phase of a mixture comprising ammonia, a hydrocarbon such as methane or a mixture of hydrocarbons, and oxygen by passing the mixture over a catalyst such as platinum metal or a platinum metal alloy at a high temperature.

In the above-mentioned catalytic production of hydrocyanic acid it is known that the platinum metal catalyst may be employed in the massive form, such as one or more layers of platinum wire gauze, or the platinum metal may be carried as a surface coating on a granular refractory material. In the co-pending application of Parkhill et al. Serial No. 5,557 filed January 29, 1960, the disclosure of which is incorporated by reference herein, there is described and claimed an improvement in a process for the manufacture of hydrocyanic acid by reaction of a mixture consisting essentially of ammonia, a hydrocarbon such as methane or a mixture of hydrocarbons, and oxygen by passing the mixture in the vapour phase over a platinum metal or platinum metal alloy catalyst at a high temperature, which improvement comprises adding to the reactants a volatile sulphur-containing material in such amount that the said reactants contain 1–500 mg. of sulphur per m.$^3$ and adjusting the oxygen content of the said reactants, whereby an increased conversion of ammonia and hydrocarbon to hydrocyanic acid is obtained.

We have now found that a special advantage can be obtained by adding a volatile sulphur-containing material to the above-mentioned reactant mixture in the catalytic production of hydrocyanic acid when the platinum or platinum alloy catalyst is in the massive form such as one or more layers of platinum wire gauze.

It is known that when a gauze catalyst is first taken into service in the manufacture of hydrocyanic acid it requires a maturing period under operating conditions before it reaches maximum catalytic activity. This period may be as long as 5 days, during which time the conversion of reactants to hydrocyanic acid is lower than for normal production working and is slowly increasing to the normal optimum. On a large plant this reduced conversion can mean a significant wastage of raw materials and loss of output. We have found, however, that the activation period for a gauze catalyst can be reduced to a few hours under operating conditions in the plant if controlled amounts of a volatile sulphur-containing material are added to the reactants. When the gauze catalyst has been thus activated an improved catalytic efficiency is maintained even when the supply of sulphur-containing material is cut off.

According to the present invention, therefore, an improvement in a process for the manufacture of hydrocyanic acid by passing a mixture consisting essentially of ammonia, a hydrocarbon such as methane or a mixture of hydrocarbons, and oxygen in the vapour phase through one or more layers of a platinum metal or platinum metal alloy gauze catalyst at a high temperature, is characterised in that the catalyst has immediately before use been subjected for at least 1 hour to an activation process which comprises passing through said catalyst a reactant mixture consisting essentially of ammonia, a hydrocarbon such as methane or a mixture of hydrocarbons, and oxygen at a high temperature, said reactant mixture containing a volatile sulphur-containing material in amount equivalent to 2–200 mg. S/m.$^3$ of the mixture.

Smaller amounts than 2 mg. S/m.$^3$ of the reactant mixture do not give the desired rapid activation of the catalyst. Larger amounts than 200 mg. S/m.$^3$ serve no useful purpose since they do not increase the speed or extent of activation, and in fact very much larger amounts, for example amounts greater than about 500 mg. S/m.$^3$, give no activation and appear to poison the catalyst. We therefore employ volatile sulphur-containing material in the range equivalent to 2–200 mg. S/m.$^3$ of the reactant mixture.

By the term "platinum metal or platinum metal alloy gauze" we mean platinum metal or an alloy containing at least about 50% by weight of platinum metal, for example an alloy consisting of 90% by weight platinum and 10% by weight rhodium, which metal is in the massive form and of a foraminate structure such as woven wire gauze or a multi-holed sheet.

The preferred sulphur-containing material is carbon disulphide since this produces the catalyst activation at very low levels of addition, but other volatile sulphur-containing materials, both organic and inorganic compounds may also be employed, for example thiophene, mercaptans such as methyl, ethyl, propyl and butyl mercaptans, thioethers such as dimethyl and diethyl sulphide, and hydrogen sulphide.

It is known to use oxygen or air as the oxygen source in the catalytic production of hydrocyanic acid, and we have found that the rapid activation process of the invention is applicable to both oxygen and air systems.

As the hydrocarbon component of the feed mixture in the catalytic synthesis of hydrocyanic acid it is usual to employ methane or mixtures of methane with a lesser proportion of its homologues such as ethane, propane and butane, for example to employ the lower paraffinic hydrocarbons obtained from natural gas or from the gases produced in petroleum refining, and this is what is meant herein by the term "a hydrocarbon such as methane or a mixture of hydrocarbons." In carrying out the process of the invention, the volume ratio of hydrocarbon to ammonia in the reactant gases may suitably be in the range 0.7:1 to 1.8:1, and preferably in the range 0.7:1 to 1.4:1. The volume ratio of oxygen to ammonia in the reactant gases is suitably in the range 0.7:1 to 1.3:1 when oxygen itself is supplied, and in the range 0.8:1 to 1.8:1 when air is used as the source of oxygen, the oxygen content of the reactants being adjusted within this range during working in order to obtain maximum conversion of ammonia to hydrocyanic acid, as is known for the normal catalytic production of hydrocyanic acid.

In the aforementioned manufacture of hydrocyanic acid by passing a mixture consisting essentially of ammonia, hydrocarbon and oxygen over a platinum metal or platinum metal gauze catalyst at a high temperature it is known to maintain the catalyst temperature in the range 700–1250° C. during normal production working. The optimum temperature depends to some extent on the composition of the feed gases but is usually about 1000° C.

As aforesaid it is conventional practice to activate a fresh gauze catalyst by working it in a production unit at reduced conversion efficiency for hydrocyanic acid until it is fully activated, after which production at normal conversion efficiency is continued. During the activation period, which may be as long as 5 days, the conversion efficiency is slowly increasing and it is necessary to adjust the oxygen content of the reactants frequently over this period in order to obtain optimum conversion at all times commensurate with the ruling catalyst activity. By operating according to the present invention the catalyst activation period is reduced to a few hours, usually 1–2 hours. Thus the process of the present invention avoids the need for troublesome adjustment of the oxygen content of the reactants over several days as well as increasing production by bringing the catalyst activity to optimum very much more quickly.

The invention is most suitably carried out in such a way that the catalyst is not allowed to cool between the activation process and the production of hydrocyanic acid in known manner which follows the activation. For example the fresh catalyst may be mounted in conventional apparatus for the production of hydrocyanic acid and a reactant mixture comprising ammonia, a hydrocarbon such as methane, and oxygen, and containing the desired amount of volatile sulphur-containing material may be passed over the catalyst with a catalyst temperature of approximately 1000° C. for an activation period which is at least 1 hour and usually 1–2 hours. During this activation period the oxygen content of the reactant mixture is adjusted to obtain maximum conversion of ammonia to hydrocyanic acid as determined by analysis of the product gases. At the end of the activation period, when the efficiency of conversion of ammonia to hydrocyanic acid has reached a maximum, the supply of sulphur-containing material to the reactants may be cut off and the catalytic production of hydrocyanic acid may be continued at high efficiency with substantially sulphur-free reactants.

The invention is further illustrated by the following examples:

*Example 1*

A sulphur-free hydrocarbon gas comprising approximately 70% methane and 30% hydrogen was mixed with ammonia gas to a C:NH$_3$ ratio of 1:1, calculated by volume on the hydrocarbon and ammonia content, and was caused to react by passing it in admixture with oxygen at a linear velocity of approximately 3 ft./sec. (calculated for gases at 20° C. and 760 mm. pressure) through a 7-layer 90/10 platinum/rhodium alloy wire gauze catalyst. On adjusting the oxygen content of the reactant mixture a maximum conversion of 61% of the ammonia to hydrocyanic acid was obtained. Carbon disulphide was then added to the reactant stream in amount equivalent to 5 mg. S/m.$^3$ of the total feed gases, whereupon the conversion of ammonia to hydrocyanic acid increased and had risen to a new maximum of 66% at the end of 1 hour.

*Example 2*

The procedure of Example 1 was repeated in duplicate using in each case a fresh 7-layer gauze catalyst. An initial conversion of 61% of the ammonia to hydrocyanic acid with sulphur-free reactants rose to 69–70% over 2 hours when the carbon disulphide was added. In one of the duplicate experiments the addition of carbon disulphide was then continued and in the other experiment the carbon disulphide was cut off. In both cases the conversion of ammonia to hydrocyanic acid remained at 69–70%, thus showing that the initial addition of the sulphur compound has a true activating effect on the catalyst.

*Example 3*

A 7-layer 90/10 platinum/rhodium alloy gauze catalyst was employed in the catalytic production of hydrocyanic acid from a sulphur-free reactant mixture as in Example 1 but in which the oxygen supply was replaced by air. An initial conversion of ammonia to hydrocyanic acid of about 40% rose to 62% when carbon disulphide was added to the reactant stream in amount equivalent to 20 mg. S/m.$^3$ of the total feed gases. After 2 hours the supply of carbon disulphide was cut off and the ammonia conversion efficiency was thereafter found to be 58%.

What I claim is:

1. A process for the manufacture of hydrocyanic acid comprising: pretreating a catalyst in massive form and of a foraminate structure containing at least about 50% by weight platinum metal by passing through it at a high temperature for at least one hour a mixture of ammonia, hydrocarbon, oxygen and volatile sulfur-containing material in an amount equivalent to about 2–200 mg. S/m.$^3$ of the mixture and thereafter passing through said catalyst at high temperature a mixture consisting essentially of ammonia, hydrocarbon and oxygen.

2. A process according to claim 1, wherein the catalyst contains about 90% by weight platinum and about 10% by weight rhodium.

3. A process according to claim 1, wherein the catalyst is in the form of woven wire gauze.

4. A process according to claim 1, wherein the catalyst pre-treatment time is 1–2 hours.

5. A process according to claim 1, wherein the volatile sulphur-containing material is carbon disulphide.

6. A process according to claim 1, wherein the oxygen content of the said mixture is supplied as air.

7. A process according to claim 1, wherein the catalyst temperature is about 1000° C.

References Cited in the file of this patent

UNITED STATES PATENTS 2,006,981     Andrussow               July 2, 1935